United States Patent [19]

Murakami

[11] Patent Number: 5,021,910
[45] Date of Patent: Jun. 4, 1991

[54] BURIED SERVO MAGNETIC HEAD

[75] Inventor: Yoichi Murakami, Tokyo, Japan

[73] Assignee: NEC Corporation, Tokyo, Japan

[21] Appl. No.: 488,836

[22] Filed: Mar. 6, 1990

[30] Foreign Application Priority Data

Mar. 6, 1989 [JP] Japan .................................. 1-54271

[51] Int. Cl.[5] ........................ G11B 5/17; G11B 5/596; G11B 21/10
[52] U.S. Cl. .................................. 360/123; 360/77.05; 360/77.07; 360/77.11
[58] Field of Search .................. 360/123, 77.05, 77.07, 360/77.11

[56] References Cited

U.S. PATENT DOCUMENTS

| | | | |
|---|---|---|---|
| 3,697,705 | 10/1972 | Holt | 360/123 |
| 3,871,024 | 3/1975 | Camras | 360/123 |
| 3,881,194 | 4/1975 | Heaslett et al. | 360/123 |
| 4,313,140 | 1/1982 | Keidl | 360/77.07 |
| 4,460,934 | 7/1984 | Yamada | 360/123 |
| 4,639,812 | 1/1987 | Nakamichi | 360/123 |
| 4,782,415 | 11/1988 | Vinal | 360/123 |
| 4,825,318 | 4/1989 | Hoo et al. | 360/123 |

Primary Examiner—Robert S. Tupper
Attorney, Agent, or Firm—Sughrue, Mion, Zinn, Macpeak & Seas

[57] ABSTRACT

A device for reading servo information from a medium in a buried servo magnetic head system. The device consists of a coil for reading/writing data in the medium and a coil for reading the low-frequency servo signal, both coils being wound around the same core. The servo coil has a greater number of turns than the read/write coil which results in the servo signal having a lower resonance frequency than the read/write signal. By obtaining a separate read/write signal and a servo signal produced from a single core in a single head, physical positional errors are avoided without sacrificing the optimization of the separate signals.

8 Claims, 2 Drawing Sheets

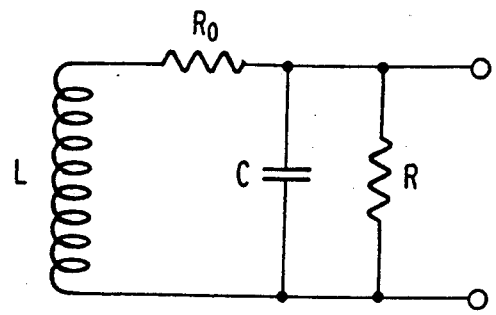
FIG. 4
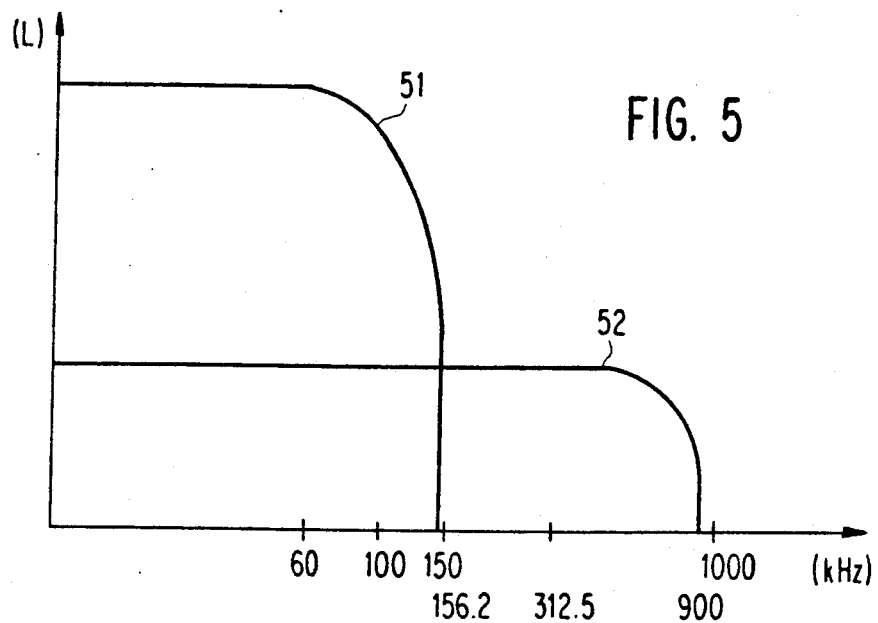
FIG. 5
FIG. 6
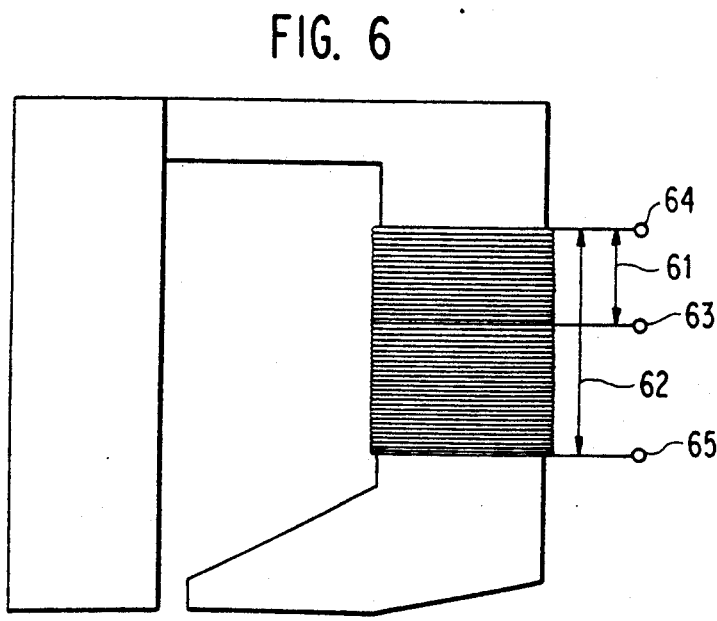

BURIED SERVO MAGNETIC HEAD

BACKGROUND OF THE INVENTION

The present invention relates to a magnetic head and, more particularly, to a magnetic head for use with a buried servo magnetic storage apparatus.

Various approaches have heretofore been proposed for positioning a magnetic head over a disk medium with accuracy. Recording a servo signal in a part of the data surface of a disk medium is a typical approach. Specifically, a read/write head reproduces the servo signal out of the disk medium along with data. The servo signal is indicative of the current position of the read/write head.

The system using a servo signal as stated above may generally be classified into two types, i.e., a sector servo type system which records a servo signal in a part of a track and a buried servo type system which records a servo signal deep below the surface of a disk in such a manner to underlie a data signal.

In the buried servo system, two different methods are available for reading servo information out of a disk medium. One of them is to construct two independent heads into a single body so as to reproduce a read/write signal and a servo signal independently of each other. The other method is to separate a read/write signal and a servo signal from each other by processing a signal which is produced from a single head. The first-mentioned method compares unfavorably with the second-mentioned method with respect to physical positional errors, because a gap for the detection of a position and a gap to be positioned are spaced apart from each other, if not noticeably. The second-mentioned method is inferior to the first-mentioned method with respect to the optimization of the head, because it is constructed to produce both of a read/write signal and a servo signal out of the same core and coil.

SUMMARY OF THE INVENTION

It is therefore an object of the present invention to provide a magnetic head which makes the most of the merits of the two different methods discussed above.

In accordance with the present invention, a magnetic head has a single core, a coil for reproducing a servo signal, and a coil for reproducing a read/write signal. The two coils are wound around the single core.

BRIEF DESCRIPTION OF THE DRAWINGS

The above and other objects, features and advantages of the present invention will become more apparent from the following detailed description taken with the accompanying drawings in which:

FIG. 4 is a circuit diagram showing an equivalent circuit of a magnetic head;

FIG. 5 is a graph showing a relationship between a reproduction frequency and an inductance in accordance with the present invention; and FIG. 6 is a side elevation of a magnetic head core representative of an alternative embodiment of the present invention.

DESCRIPTION OF THE PREFERRED EMBODIMENTS

Figure 1:
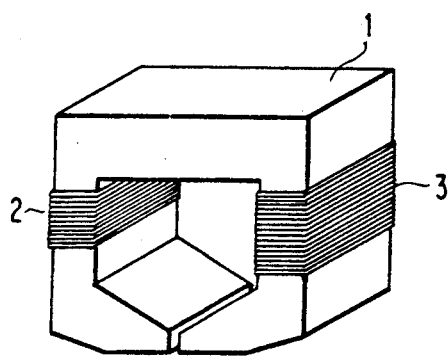
FIG. 1 is a perspective view of a magnetic head embodying the present invention.

Referring to FIG. 1 of the drawings, a varied servo magnetic head embodying the present invention is shown. As shown, the magnetic head is made up of a core 1 and coils 2 and 3 which are wound around the core 1. The coil 2 is adapted for a read/write signal, while the coil 3 is adapted for a servo signal and different in the number of turns from the coil 2.

Figure 2:
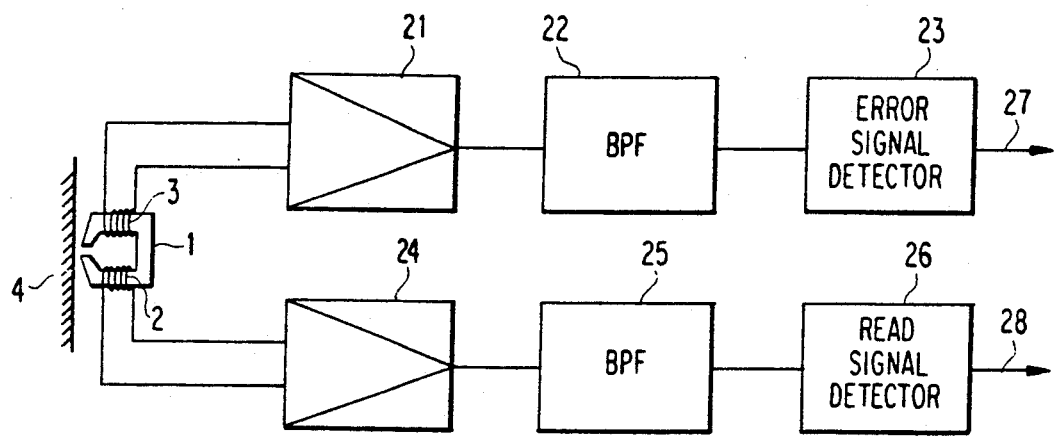
FIG. 2 is a block diagram schematically showing circuitry for generating signals out of coils which are included in the head of FIG. 1.

As the magnetic head shown in FIG. 1 scans a recording medium 4, FIG. 2, a current is generated in the individual coils 2 an 3. A signal processing circuit shown in FIG. 2 generates a read/write signal and a servo signal in response to the generated in the coils 2 and 3.

How the illustrative embodiment processes signals will be described with reference to FIGS. 1 and 2. When the core 1 of the magnetic head scans the recording medium 4, a current is generated in both the servo coil 3 and read/write coil 2, as stated above. The current generated in the servo coil 3 is amplified by an amplifier 21. A band pass filter (BPF) 22 is connected to the amplifier 21 at one end and to an error signal detector 23 at the other end. The BPF 22, therefore, passes only the frequency of an error signal included in the amplified current to the error signal detector 23. In response, the error signal detector 23 shapes the waveform of the input signal and thereby produces an error signal 27.

Likewise, the current generated in the read/write coil 2 is routed through an amplifier 24 and a BPF 25 to a read signal detector 26. In response, the read signal detector 26 produces a read signal 28. The BPF 25 passes the frequency of a read/write signal. In a specific arrangement which will be described, the BPF 22 has a pass band ranging from 50 kHz to 70 kHz while the BPF 25 has a pass band ranging from 80 kHz to 600 kHz.

The illustrative embodiment will be described more specifically in relation to a specific construction of a buried servo magnetic disk drive.

Figure 3A:
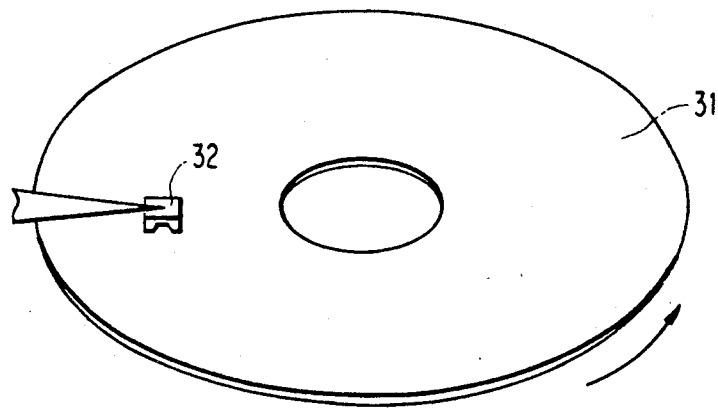
FIG. 3A is a perspective view representative of a relationship between a head in accordance with the present invention and a magnetic medium.

Referring to FIG. 3A, there is shown a magnetic disk medium 31 which is rotatably supported by a spindle of a disk drive, not shown, and a magnetic head 32 is supported above the magnetic medium 31. As the medium 31 is rotated, the head 32 picks up information from the medium 31.

Figure 3B:
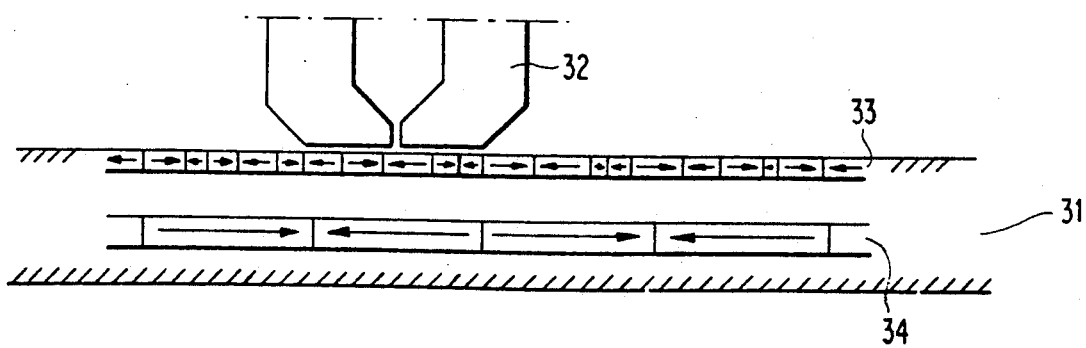
FIG. 3B is a section associated with FIG. 3A.

FIG. 3B shows the magnet disk medium 31 in an enlarged section. As shown, a read/write pattern 33 is formed in a part of the medium 31 which adjoins the head 32. A servo pattern 34 is formed in another part of the medium 31 which is deep enough to escape the influence of a recording operation of the head 32. With a buried servo type system, it is a common practice to provide the servo pattern 34 with a density lower than the density of the read/write pattern 33. In the illustrative embodiment, the density of the servo pattern 34 is as low as one-fifth of the density of the read/write pattern.

In this embodiment, it is assumed that the magnetic disk medium 31 has a recording density of 36.5 BPI at the innermost track, and that the spindle is rotated at a speed of 360 r.p.m. In this condition, the read/write signal to be recorded in a MFM (Modified Frequency Modulation) code format has a frequency ranging from 156.2 kHz. On the other hand, the servo signal has a frequency of approximately 60 kHz. A read head, therefore, is required to have an inductance which matches such different frequencies. The inductance L of the head is expressed as:

$$L = \frac{N^2}{R_M} \quad (1)$$

where N is the number of turns of the coil, and $R_M$ is the magnetic resistance of the head. The magnetic resistance $R_M$ is determined by the shape and material of the core and other similar parameters.

In this embodiment, the independent coils share the same core. Hence, assuming that the magnetic resistance is the same, optimization will be achieved if each coil is provided with a different number of turns.

The magnetic head may be represented by an equivalent circuit as shown in FIG. 4. Hence, the resonance frequency f is produced by:

$$f = 1/(2\pi \sqrt{LC}) \quad (2)$$

The optimal value of the resonance frequency f should be approximately three times the frequency of a reproduced signal in consideration of the signal-to-noise (S/N) ratio, for example, as generally accepted in the art. In the light of this, the resonance frequency of the read/write coil is selected to be 900 kHz which is about three times the highest frequency of the read/write signal, i.e. 312.5 kHz. On the other hand, the servo coil should preferably have a resonance frequency of 180 kHz or so when the frequency of 60 kHz of the servo signal is taken into account. However, the resonance frequency of the servo coil is selected to be slightly lower than the lowest frequency of the read/write signal. Hence, the resonance frequency of the servo coil is 150 kHz. The logic stated so far will be discussed more generically in relation to MFM.

First, the resonance frequency of the read/write coil is selected to be approximately three times the highest frequency of the read/write signal. The resonance frequency of the servo coil should be slightly lower than the lowest frequency of the read/write signal. The read/write signal implemented by MFM has the highest frequency which is twice higher than the lowest frequency. Therefore, the resonance frequency $f_{(R/W)}$ of the read/write coil and the resonance frequency $f_{(S)}$ is related as follows:

$$f_{(S)} = f_{(R/W)}/6 \quad (3)$$

From the equations (1) and (2), $$f = a \frac{1}{N\sqrt{C}} \quad (a: \text{constant}) \quad (4)$$

In the above equation, the read/write coil and the servo coil have the following relationship:

$$f_{(S)} = a \frac{1}{N_{(S)}\sqrt{C_{(S)}}}$$

-continued $$f_{(R/W)} = a \frac{1}{N_{(R/W)}\sqrt{C_{(R/W)}}}$$

Therefore $$6N_{(R/W)}\sqrt{C_{(R/W)}} = N_{(S)}\sqrt{C_{(S)}} \text{ (because of (3))}$$

Assuming that $C_{(S)}$ is four times $C_{(R/W)}$, for example, then $N_{(S)}$ which is three times $N_{(R/W)}$ will suffice.

FIG. 5 shows curves representative of the inductance of each coil and the frequency of data. The equation (1) for determining the inductance is an expression pertaining to a condition wherein the frequency is sufficiently low. When the servo coil has a characteristic represented by a curve 51 in the figure, a sufficient output is attainable at the frequency of 60 kHz of the servo signal. When the read/write coil has a characteristic 52 which covers a broader range than the servo coil, the frequency of the read/write signal is detected only by the read/write coil. This is successful in optimizing the playback characteristic and, therefore, in implementing a magnetic head having a high S/N ratio for a buried servo magnetic disk drive.

FIG. 6 depicts an alternative embodiment of the present invention. In this embodiment, a tap 63 is provided at the intermediate between opposite ends of a single coil. The turns existing between one end 64 of the coil and the tap 63 form a coil 61 for a read/write signal, while the turns existing between the tap 63 and the other end 65 of the coil form a coil 62 for a servo signal. The end 64 is shared by the two coils 61 and 62. The configuration shown in FIG. 6 is simple and can be implemented by a conventional core without any design modification. Further, such a head can be fabricated with ease.

What is claimed is:

1. A buried servo magnetic head using an exclusive continuous low-frequency signal for servo which is recorded in a data surface of a medium, comprising:
   a core;
   a first coil wound around said core for reading/writing data from or to the medium; and
   a second coil wound around said core for reading said low-frequency servo signal, said second coil having a different number of turns than said first coil.

2. A magnetic head as claimed in claim 1, wherein said first coil forms a part of said second coil.

3. A magnetic head as claimed in claim 1, wherein said second coil has a greater number of turns than said first coil.

4. A magnetic head as claimed in claim 1, wherein said second coil has a resonance frequency three times the frequency of said low-frequency servo signal.

5. A magnetic head as claimed in claim 1, wherein said second coil has a resonance frequency lower than the lowest frequency of said data signal.

6. A magnetic head as claimed in claim 1, wherein said first coil has a resonance frequency approximately three times the highest frequency of said data signal.

7. A buried servo magnetic head using an exclusive continuous low-frequency signal for servo which is recorded in a data surface of a medium, comprising:
   a core;
   a first coil wound around said core for reading/writing data in the medium;

a second coil wound around said core for reading said low-frequency servo signal, said second coil having a different number of turns than said first coil; and a signal processing unit, for processing said low-frequency servo signal and said read signal comprising first means for amplifying, filtering, and shaping said low-frequency servo signal to produce an error signal, and second means for amplifying, filtering and detecting said read signal.

8. A magnetic head as claimed in claim 7, wherein:

said first means comprises a first amplifier for amplifying said servo signal, a first band pass filter, connected to said first amplifier, for filtering said low-frequency servo signal, and an error signal detector, connected to said first band pass filter, for shaping the waveform received from said first band pass filter and producing an error signal; and said second means comprises a second amplifier for amplifying said read signal, a second band pass filter, connected to said second amplifier, for filtering said read signal, and a read signal detector, connected to said second band pass filter, for detecting said read signal and producing said read signal.

* * * * *

UNITED STATES PATENT AND TRADEMARK OFFICE
CERTIFICATE OF CORRECTION

PATENT NO. : 5,021,910

DATED : 6/4/91

INVENTOR(S) : Murakami

It is certified that error appears in the above-identified patent and that said Letters Patent is hereby corrected as shown below:

Column 3, line 2, after "156.2 kHz", insert --to 312.5 kHz--.

Signed and Sealed this

Sixth Day of October, 1992

Attest:

DOUGLAS B. COMER

*Attesting Officer*       *Acting Commissioner of Patents and Trademarks*